Sept. 18, 1951      E. R. BARRETT      2,568,049
COOKING UTENSIL
Filed Oct. 31, 1947      2 Sheets-Sheet 1
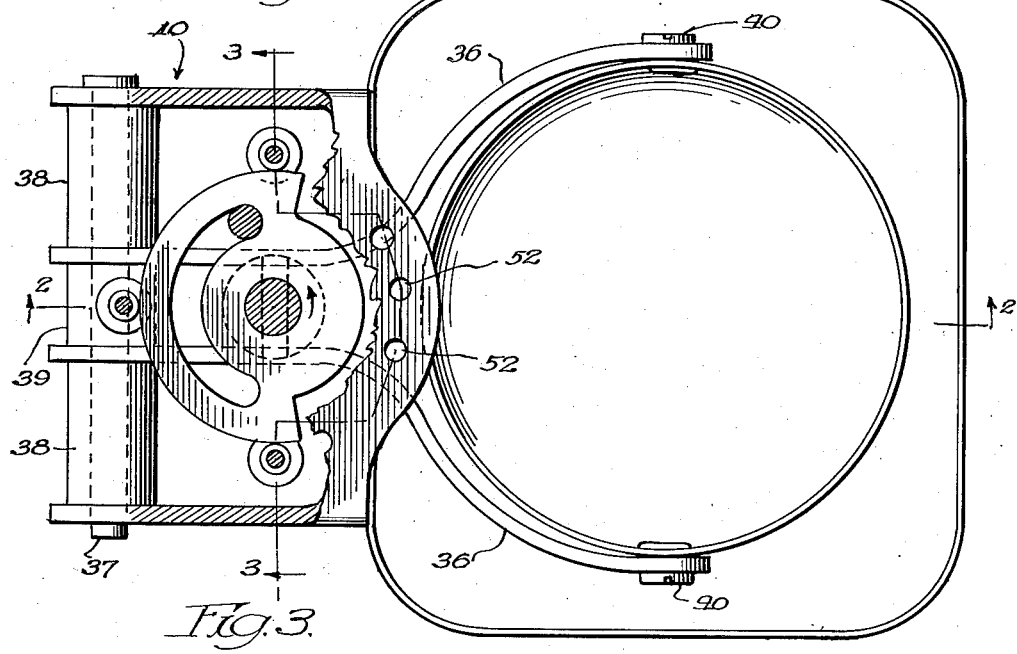
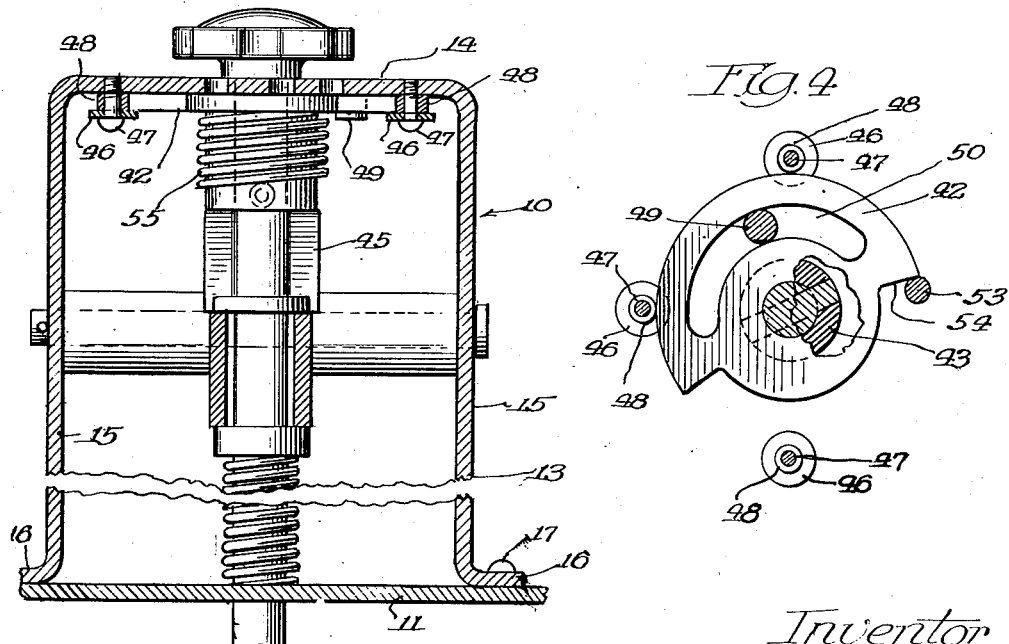
Inventor
Edward R Barrett
By Thed Gerlach
Atty Sept. 18, 1951  E. R. BARRETT  2,568,049
COOKING UTENSIL
Filed Oct. 31, 1947  2 Sheets-Sheet 2

Inventor
Edward R. Barrett
By Fred Gerlach
Atty

Patented Sept. 18, 1951

2,568,049

UNITED STATES PATENT OFFICE 2,568,049

COOKING UTENSIL

Edward R. Barrett, Chicago, Ill., assignor to Frederick E. Hummel, Chicago, Ill.

Application October 31, 1947, Serial No. 783,343

4 Claims. (Cl. 161—1)

Specifically, this invention has to do with cooking utensils and relates more especially to egg boilers; but it entails also a novel timing or delayed-action mechanism having prospective application to many arts in addition to the culinary art.

An immediate object of the invention is to provide a utensil for boiling eggs which will automatically withdraw the eggs from the boiling water following the expiration of a predetermined period of time and which, preferably, can be set to boil the eggs for any selected one of several available time periods such, for example, as two, three or four minutes.

A further object is to devise a utensil of the above-indicated character which is simple to operate, reasonably compact, completely dependable, relatively inexpensive to manufacture, and capable of being easily and thoroughly cleaned.

Another object is to provide a timing or delayed-action mechanism of simple, rugged and reliable construction which is well adapted to my immediate purpose; but I have in mind that said mechanism is capable of wide and varied utility in numerous arts, and especially where it may frequently be necessary to change quickly from one timing period to another.

While I have illustrated and described what is specifically denominated an egg boiler, it will at once be apparent that the subject utensil can be used for cooking other edibles such, for instance, as French fried potatoes, doughnuts, etc.; and it will be evident that devices embodying the invention and appropriately dimensioned can be put to many additional uses in the industrial arts.

In the drawings which accompany this specification:

Fig. 1 is a plan view of a cooking utensil according to a preferred embodiment of the invention;

Fig. 3 is a fragmentary sectional view taken at line 3—3 of Fig. 1;

Fig. 4 is a detail view taken at line 4—4 of Fig. 2 and showing the index plate in contact with the index pin.

Figure 2:
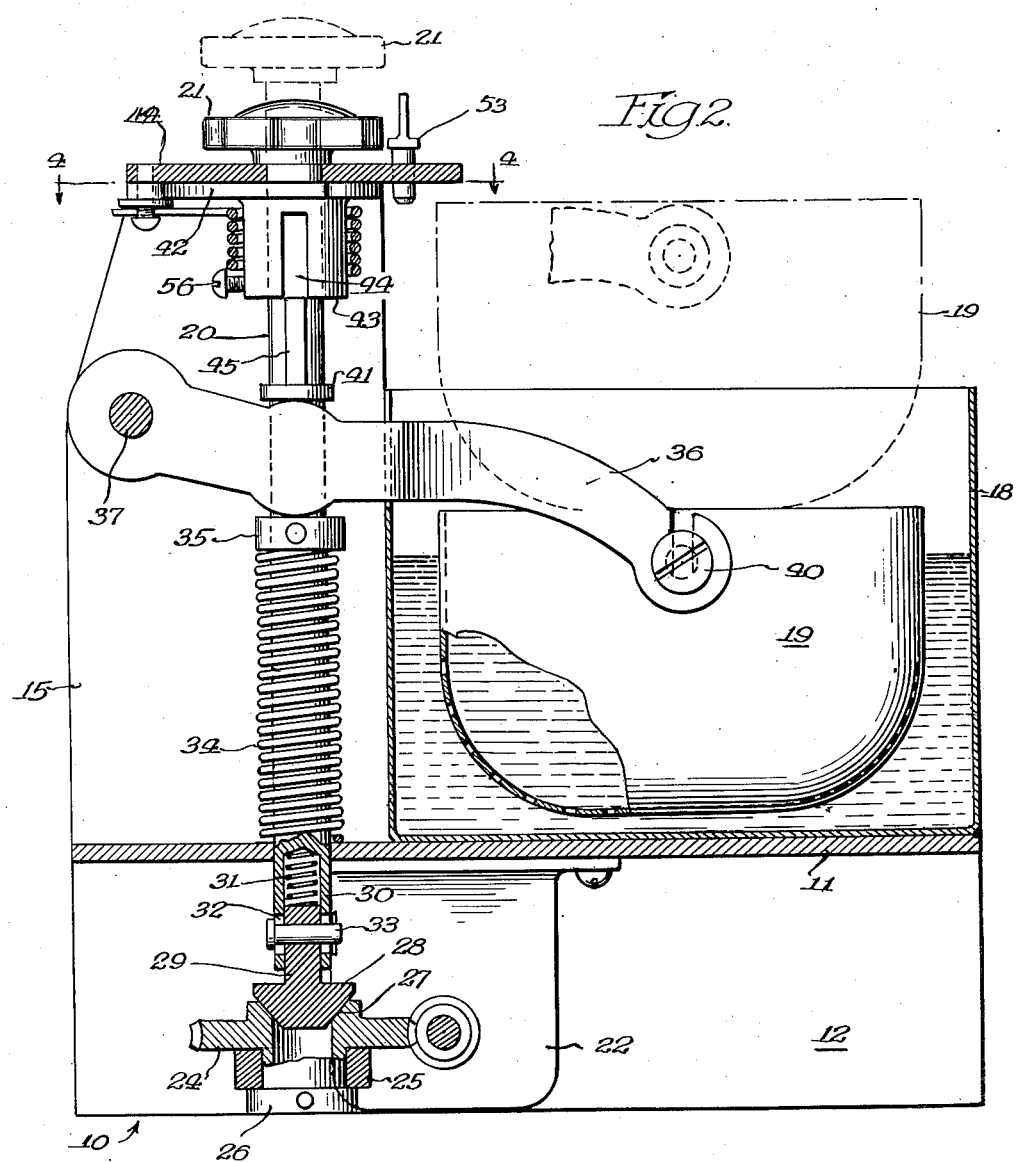
Fig. 2 is a vertical section taken at line 2—2 of Fig. 1.
Figure 5:
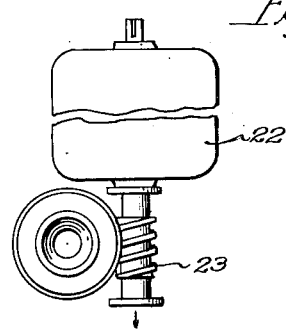
Fig. 5 is a detail of the worm drive.

The frame of the utensil is identified as a whole by reference numeral 10 and is of a design which conveniently can be fabricated of steel or aluminum plates or sheets. Said frame includes a platform 11 consisting of a plate bent to form two parallel vertical walls or legs 12 which are adapted to rest on a shelf or table top or the like. Mounted upon and riveted to platform 11 and forming an integral part of the frame is a superstructure 13 comprising an inverted U-shaped member including a top plate 14 and a pair of vertical legs 15—which latter are flanged at 16 and secured to the platform 11 by rivets 17—see Fig. 3.

A vessel 18, designed to hold water or other fluid cooking medium, rests on platform 11 and may be heated by a gas flame disposed below the platform; or it may be heated electrically. So far as the subject invention is concerned, the particular means employed for heating the water or other fluid in vessel 18 is immaterial; but for boiling eggs it is important that a substantially constant temperature be maintained so that a given cooking period will produce uniform results.

Disposed within vessel 18 is a foraminous receptacle or basket 19 proportioned to hold a suitable number of eggs or other items to be cooked. It may be well to mention at this point that the content of vessel 18 may be hot cooking fat instead of water and that the basket 19 may contain, for example, sliced potatoes, doughnuts or chicken.

A vertical shaft or plunger 20 is journaled in the top plate 14 and also in plate 11 and is both rotatable and slidably movable lengthwise to a limited extent. In Fig. 2 said shaft is shown in its down position, but its up position is indicated by the dotted outline of the knob 21, which latter is secured to the upper end of the shaft.

Mounted underneath and attached to platform 11 is an electric motor 22 having an inbuilt speed reduction gear; and attached to the drive-shaft of said motor is a worm 23 which is meshed with a worm-wheel 24—the latter being supported on a bearing 25 and secured in place by a collar 26. Worm wheel 24 rotates continuously at a very slow speed, as, for example, one revolution in twelve minutes; and it has a frustro-conically bored seat at 27 concentric with its axis of rotation, which seat is designed to frictionally engage a male clutch member 28. Said clutch member has a shank 29 which is slidably fitted in a bore 30 at the lower end of shaft 20 and is pressed downwardly by a coil spring 31 within said bore—said coil spring functioning as a cushion to enable shaft 20 to move downwardly to some extent after the clutch is engaged. Shaft 20 is slotted at 32 to engage a drive pin 33 which passes through the shank 29. Slot 32 permits up and down movement of clutch member 28 relatively to shaft 20 but limits the extent of such movement so that when the shaft is raised to its up position the clutch will be disengaged. When the clutch is engaged shaft 20 rotates with and is driven by worm-wheel 24—the direction of rotation being counterclockwise as viewed in Fig. 1. Shaft 20 is biased upwardly by a coil spring 34 which bears at its lower end against platform 11 and at its upper end against a collar 35 which is pinned to the shaft.

A pair of lever arms 36, 36 are fulcrumed at one end on a pin 37, carried by legs 15, and suitably spaced by separators 38 and 39. Said lever arms are bent arcuately, as shown in Fig. 1, to form, conjointly, a yoke designed for detachable connection to a pair of trunnions 40, 40 attached to receptacle 19; and they rest upon collar 35 by means of which they are rotated about their fulcrum pin 37 to lift receptacle 19 to the position in which it is shown in dot-dash outline in Fig. 2. A flange 41 formed on shaft 20 serves to press lever arms 36 downwardly when shaft 20 is depressed.

Suspended beneath top plate 14 and concentric with shaft 20 is an index plate 42 having a depending hub 43 bored to fit shaft 20 and having a keyslot 44 designed to receive a key 45 which is carried by or integral with shaft 20. Said key projects laterally from shaft 20 at opposite sides thereof, as most clearly shown in Fig. 3.

The index plate 42 is freely supported by three washers 46 which underlap the peripheral margin of the plate and are suspended on three screws 47 by which they are clamped against tubular spacers 48. A pin 49 secured to top plate 14 engages an arcuate slot 50 in the index plate and serves to limit the rotational travel of said plate.

Top plate 14 has three round holes 52 spaced apart at equal radial distances from the axial center of shaft 20 (see Fig. 1) each of which is adapted to receive an index pin 53 (see Fig. 2) which can be transferred from hole to hole—the selected hole determining the elapsed cooking time.

The index plate has a shoulder 54 adapted to engage the index pin 53, as depicted in Fig. 4, and it will be apparent that the position of said pin (which is to say the hole in which it is inserted) determines the extent to which the index plate can be rotated clockwise, as viewed in Fig. 4. Pin 49 and slot 50 determine the limit of counterclockwise movement of the index plate.

A helical torsion spring 55 embraces hub 43 of the index plate and is anchored thereto at one end by a screw 56—the other end of said spring being anchored to one of the screws 47. Said spring is biased torsionally to rotate the index plate counterclockwise, as viewed in Figs. 1 and 4, and serves normally to hold the index plate in the position in which it is shown in Fig. 1—that position being referred to herein as the normal position of the index plate.

When the utensil is not in use, the shaft 20 is up and the key 45 is disposed within slot 44—the clutch being then disengaged; and, obviously, the receptacle 19 is in its up position, as indicated in dot-dash outline in Fig. 2.

To put the utensil into operation—assuming the water in vessel 18 to be at the proper temperature and the eggs or other comestibles in the receptacle 19—the motor is started and the index pin 53 inserted in one of the holes 52. Then knob 21 is rotated clockwise until the shoulder 54 of the index plate strikes the index pin. Thereupon, while holding the knob in the rotated position, the knob and shaft are depressed, and this results in the clutch becoming engaged, the receptacle 19 being lowered into vessel 18, and key 45 becoming fully withdrawn from keyslot 44. The index plate is then free and is abruptly rotated in the counterclockwise direction to its normal position by spring 55. Knob 21 is then manually released and shaft 20 is pressed upwardly by spring 34 so that the upper end of key 45 bears against the lower end surface of hub 43. This holds the shaft 20 in its down position wherein the clutch is engaged and, consequently, the shaft is rotated by worm-wheel 24 at the same slow speed as that of the worm-wheel.

Key 45 rotates with shaft 20 while continuing to bear upwardly against the lower end of hub 43 until it comes into alignment with keyslot 44 whereupon shaft 20 is pushed upwardly by spring 34—the key 45 entering slot 44. This action results in the receptacle 19 being elevated to its up position by lever arms 36, and also results in disengagement of the clutch.

Now it will be seen that the time required for the shaft to turn from its starting point (by which is meant the angular position which it occupies when the clutch becomes engaged) to the angular position in which key 45 will enter keyslot 44 is a direct function of the extent to which the index plate was rotated, at the outset, from its normal position; and it will be evident that the extent of rotation of the index plate is determined by the position of index pin 53; which is to say, by the hole 52 into which the index pin was inserted. By suitably positioning holes 52, having due regard for the speed of rotation of shaft 20, the utensil can be designed to lift the receptacle following any one of several predetermined time periods. Using three index holes, suitably spaced, it could be designed to afford, for example, cooking periods of two, three and four minutes, respectively—any of which periods would be obtainable by inserting the index pin in the appropriate hole. The periods mentioned are those most commonly employed in soft-boiling eggs. If the utensil is intended for other purposes it will, of course, be designed to afford longer or shorter cooking periods according to requirements.

Ordinarily, the receptacle 19 will have sufficient drag to prevent its being lifted too abruptly; but if in any specific instance this does not prove to be the case, it is recommended that a dashpot or equivalent means be added to prevent excessively rapid action.

Persons skilled in the art will at once observe that the delayed-action device forming a part of the above-described utensil has many possible uses in various arts, and I am, accordingly, claiming the same as an operative sub-combination having utility apart from the environment in which it is here shown.

Obviously, my invention is susceptible of numerous alternative specific embodiments and modifications, and I do not wish to be limited as to its scope except as clearly indicated by the terms of the appended claims.

Having described my invention, what I claim as new and wish to secure by Letters Patent is:

1. The combination in a delayed-action device, of a shaft, power means for rotating said shaft at a constant speed in a given direction, a clutch operative to couple said shaft to said power means, said shaft being movable axially in a given direction to engage said clutch and movable in the opposite direction to disengage said clutch, an index member concentric with said shaft and rotatable through a predetermined angle between a normal position and an alternate limiting position, means for selectively varying said predetermined angle, a spring biasing said index member toward its normal position, said index member being operative to hold said shaft in clutch-engaged position except when said shaft is in a certain rotative relation to said index member, and a spring biasing said shaft toward axial movement in said opposite direction.

2. The combination in a delayed-action device, of a shaft, power means for rotating said shaft at a constant speed in a given direction, a clutch operative to couple said shaft to said power means, said shaft being movable axially in a given direction to engage said clutch and movable in the opposite direction to disengage said clutch, a spring biasing said shaft in said opposite direction, an index member concentric with said shaft and rotatable through a predetermined angle between a normal limiting position and an alternate limiting position, means for selectively changing said alternate limiting position to vary said predetermined angle, a spring biasing said index member toward its normal limiting position, a key carried by said shaft, said index member having a keyslot adapted to receive said key when said key is in alignment therewith, said index member being operative to hold said shaft in clutch-engaged position except when said key is aligned with said keyslot.

3. The combination in a delayed-action device, of a shaft, power means for rotating said shaft at a constant speed, a clutch operative to couple said shaft to said power means, said shaft being movable axially in a given direction to engage said clutch and movable in the opposite direction to disengage said clutch, a spring biasing said shaft in said opposite direction, an index plate concentric with said shaft and rotatable between a normal limiting position and an alternate limiting position, an index pin operative as a stop to determine the alternate limiting position of said index plate, said device having a plurality of holes each adapted to receive said pin and to locate the same in a position to act as a stop for said index plate, said holes being spaced angularly about the center of rotation of said index plate, a spring biasing said index plate toward its normal position, said index plate having an axial bore through which said shaft extends, said shaft having a lateral projection, said index plate having a slot adapted to receive said projection when said projection is aligned therewith and thus allow axial movement of said shaft in said opposite direction, said index plate being operative to hold said shaft in clutch-engaged position except when said projection is aligned with said slot.

4. A delayed-action device comprising: a rotatable shaft movable axially between two limiting positions, power means for rotating said shaft, a clutch at one end of said shaft operative to couple said shaft to said power means only when said shaft is in a certain one of said limiting positions, an index plate concentric with said shaft and having a hub bored to receive said shaft, said shaft passing through said bore, a knob attached to said shaft at the end thereof remote from said clutch, a key carried by said shaft, said hub having a lengthwise slot adapted to receive said key, said key being disengaged from said slot when said shaft is in clutch-engaged position, said index plate being rotatable between a normal limiting position and an alternate limiting position, a torsion spring biasing said index plate toward said normal position, and means for selectively varying the angle through which said index plate is rotatable between its normal limiting position and its alternate limiting position.

EDWARD R. BARRETT.

REFERENCES CITED

The following references are of record in the file of this patent:

UNITED STATES PATENTS

| Number | Name | Date |
|---|---|---|
| 1,490,511 | Hermance | Apr. 15, 1924 |
| 1,522,988 | Warren | Jan. 13, 1925 |
| 1,986,412 | Rudolph | Jan. 1, 1935 |
| 2,200,110 | Andersen | May 7, 1940 |
| 2,253,752 | Bemis | Aug. 26, 1941 |